United States Patent
Aggarwal (10) Patent No.: US 8,655,805 B2
(45) Date of Patent: Feb. 18, 2014

(54) METHOD FOR CLASSIFICATION OF OBJECTS IN A GRAPH DATA STREAM

(75) Inventor: Charu Aggarwal, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/871,168

(22) Filed: Aug. 30, 2010

(65) Prior Publication Data

US 2012/0054129 A1 Mar. 1, 2012

(51) Int. Cl.
*G06F 15/18* (2006.01)

(52) U.S. Cl.
USPC .................. 706/12; 707/5; 707/101; 707/723

(58) Field of Classification Search
None
See application file for complete search history.

(56) References Cited

U.S. PATENT DOCUMENTS

| | | | |
|---|---|---|---|
| 6,983,068 B2 | 1/2006 | Prabhakar et al. | |
| 2004/0225999 A1 | 11/2004 | Nuss | |
| 2005/0246700 A1 | 11/2005 | Archambault et al. | |
| 2006/0056804 A1 | 3/2006 | Seo et al. | |
| 2006/0085533 A1 | 4/2006 | Hussain et al. | |
| 2007/0179923 A1 | 8/2007 | Stanfill | |
| 2007/0250901 A1 | 10/2007 | McIntire et al. | |
| 2007/0288465 A1 | 12/2007 | Aggarwal et al. | |
| 2008/0123957 A1 | 5/2008 | Ratner et al. | |
| 2008/0238923 A1 | 10/2008 | Liu et al. | |
| 2008/0288255 A1 | 11/2008 | Carin et al. | |
| 2008/0313176 A1* | 12/2008 | Ma et al. ........................... 707/5 |
| 2009/0119238 A1 | 5/2009 | Amini et al. | |
| 2009/0193044 A1* | 7/2009 | Buehrer et al. ............... 707/101 |
| 2010/0281022 A1* | 11/2010 | Gollapudi et al. ............ 707/723 |

FOREIGN PATENT DOCUMENTS

WO 01/72040 9/2001

OTHER PUBLICATIONS

International Search Report issued in corresponding International Appln. No. PCT/US11/30525.

* cited by examiner

*Primary Examiner* — Kakali Chaki
*Assistant Examiner* — Luis Sitiriche
(74) *Attorney, Agent, or Firm* — William J. Stock; F. Chau & Associates, LLC (57) ABSTRACT

A method for classifying objects in a graph data stream, including receiving a training stream of graph data, the training stream including a plurality of objects along with class labels that are associated with each of the objects, first determining discriminating sets of edges in the training stream for the class labels, wherein a discriminating set of edges is one that is indicative of the object that contains these edges having a given class label, receiving an incoming data stream of the graph data, wherein class labels have not yet been assigned to objects in the incoming data stream, second determining, based on the discriminating sets of edges, class labels that are associated with the objects in the incoming data stream; and outputting to an information repository object class label pairs based on the second determining.

16 Claims, 7 Drawing Sheets

Algorithm UpdateMinHash(Incoming Edge: e ∈ G,
    Sampling Rate: k, Edge-specific Min-hash values: V
    Edge-specific Min-hash indices: I);
{ Assume that graph G is associated with a numerical
 identifier Id(G) which denotes the order in which it
was received in the data stream; }
begin
  Generate k random hash values $p_1 \ldots p_k$,
    where $p_i$ = h(i,Id(G));
    for each $p_i$ in the k generated hash values do
      begin
        if edge e is not included in current set of
          min-hash statistics (I,V) then
            Add (e,$p_i$) to V and (e,Id(G)) to I;
          else begin
          Let (e,m) ∈ V and (e,CurrentId) ∈ I be the
            current tuples in V and I associated with
            the ith min-hash value for e;
          if $p_i$<m replace (e,m) and (e, CurrentId) with
            (e,$p_i$) and (e,Id(G)) respectively;
          end
      end
end

Algorithm UpdateCompressedMinHash(Incom. Edge: e ∈ G,
    Sampling Rate: k,Min-hash values: V
    Min-hash indices: I, Column Compression Size: n);
{ Assume that graph G is associated with a numerical
 identifier Id(G) which denotes that order in which it
 was received in the data stream; }
begin
  Generate k random hash values h(1,Id(G))...h(k,Id(G));
    Map e onto integer $i_e$ in [1,n] with the use of
      a uniform random hash function;
    Apply same min-hash approach of FIG. 1 to this
      edge except that we apply to $i_e$ instead of e;
end

METHOD FOR CLASSIFICATION OF OBJECTS IN A GRAPH DATA STREAM

BACKGROUND

1. Technical Field

The present invention relates to the classification of massive graph streams.

2. Discussion of the Related Art

In machine learning, classification is the assignment of a class label to an input object. Classification arises in the context of a number of domains such as chemical and biological data, the web and communication networks. As an example, web query topic classification/categorization deals with assigning a web search query (e.g., an input object) to one or more predefined categories (e.g., a class label), based on the query's topics. For example, users issuing a web query "apple" might expect to see web pages related to the fruit apple, or they might prefer to see products or news related to the computer company. Search result pages can be grouped according to the categories predicted by a query classification algorithm.

Many data domains such as chemical data, biological data and the web are structured as graphs. In the chemical and biological domains, the nodes of the graph are drawn from a modest base of possibilities and it is assumed that the data set is of modest size. On the other hand, the web graph, communication networks, and social networks may be defined on a massive underlying universe of nodes. A graph with more than $10^7$ nodes may contain as many as $10^{13}$ edges and thus be considered massive. The nodes may correspond to URL addresses in a web graph, the IP addresses in a communication network, or the user identifiers in a social network. Links between the URL addresses, IP addresses and user identifiers are edges.

In streaming applications, data generated in some external environment is pushed asynchronously to servers that process this information. Streaming applications are characterized by the ability to process high-volume data streams in a timely and responsive fashion. A massive graph stream may include the communication pattern of users in a social network, the browsing pattern of all the users, or the intrusion traffic on a communication network.

When massive graphs are in the form of a stream, this restrains the kinds of algorithms that can be used to mine structural information for future analysis. For example, the stream constraint allows only one pass over the data. Further, the edges of a graph may arrive out of order in the data stream. The massive size of the graph also creates a challenge for effective extraction of information that is relevant to classification. For example, it is difficult to store summary information about the large number of distinct edges in the graph data. Further, since the structural behavior is governed by the combination of a large number of distinct edges, the exponential increase in complexity of the substructure determination problem is extremely rapid with substructure cardinality. In such cases, the determination of frequent discriminative subgraphs may be computationally and space inefficient to the point of being impractical.

BRIEF SUMMARY

Exemplary embodiments of the present invention provide methods and computer program products for classifying objects in a graph data stream.

The graph data stream may include a plurality of nodes that represent elements and edges that represent connections between the elements. An object in the data stream may be a group of nodes together with the edges between those nodes. In an exemplary method, a training stream of graph data is received, wherein the training stream includes a plurality of objects along with class labels that are associated with each of the objects. Discriminating sets of edges (e.g., subgraphs) in the training stream for the class labels are determined, wherein a discriminating set of edges is one that is indicative of (but not directly corresponding to) the object that includes these edges having a given class label. An incoming data stream of the graph data is then received, wherein class labels have not yet been assigned to objects in the incoming data stream. Based on the discriminating sets of edges, class labels that are associated with the objects in the incoming data stream are determined. Object class label pairs based on the second determining are output to an information repository.

DETAILED DESCRIPTION

A method for classifying an object in a graph data stream according to an exemplary embodiment of the present invention, will hereinafter be described. The graph data stream may be massive. The object may include nodes and edges of the graph that identify a pattern of web surfing. For example, web sites visited are the nodes, and the paths from one web page to another are the edges. Thus, a user who visits page 1 and then page 2 and then page 3 is likely one who has a certain property (i.e., likely to buy a particular book). The invention aims to identify such patterns and then assign these patterns with relevant labels.

To accomplish this, discriminative subgraphs present in a training stream of the graph data are first determined then given class labels. Briefly, correlated sets of edges are determined with a two-dimensional (2D) hash compression technique that reduces the incoming data into a small space. Then, dominant class labels are determined for the correlated sets of edges and given to respective subgraphs as a final class label to obtain the discriminative subgraphs. The discriminative subgraphs can then be used to infer class labels of objects in test graph streams. For example, in a case where a test graph stream including an object reflecting the above-described pattern of web surfing is received at a stream processor, a memory including the discriminative subgraphs and their associated class labels can be accessed to find those subgraphs corresponding to the incoming object. The class label of the subgraphs to which the incoming object corresponds is given to the object. In this case, the class label may indicate that the object corresponds to the pattern of a user who is likely to purchase a particular book.

Figure 1:
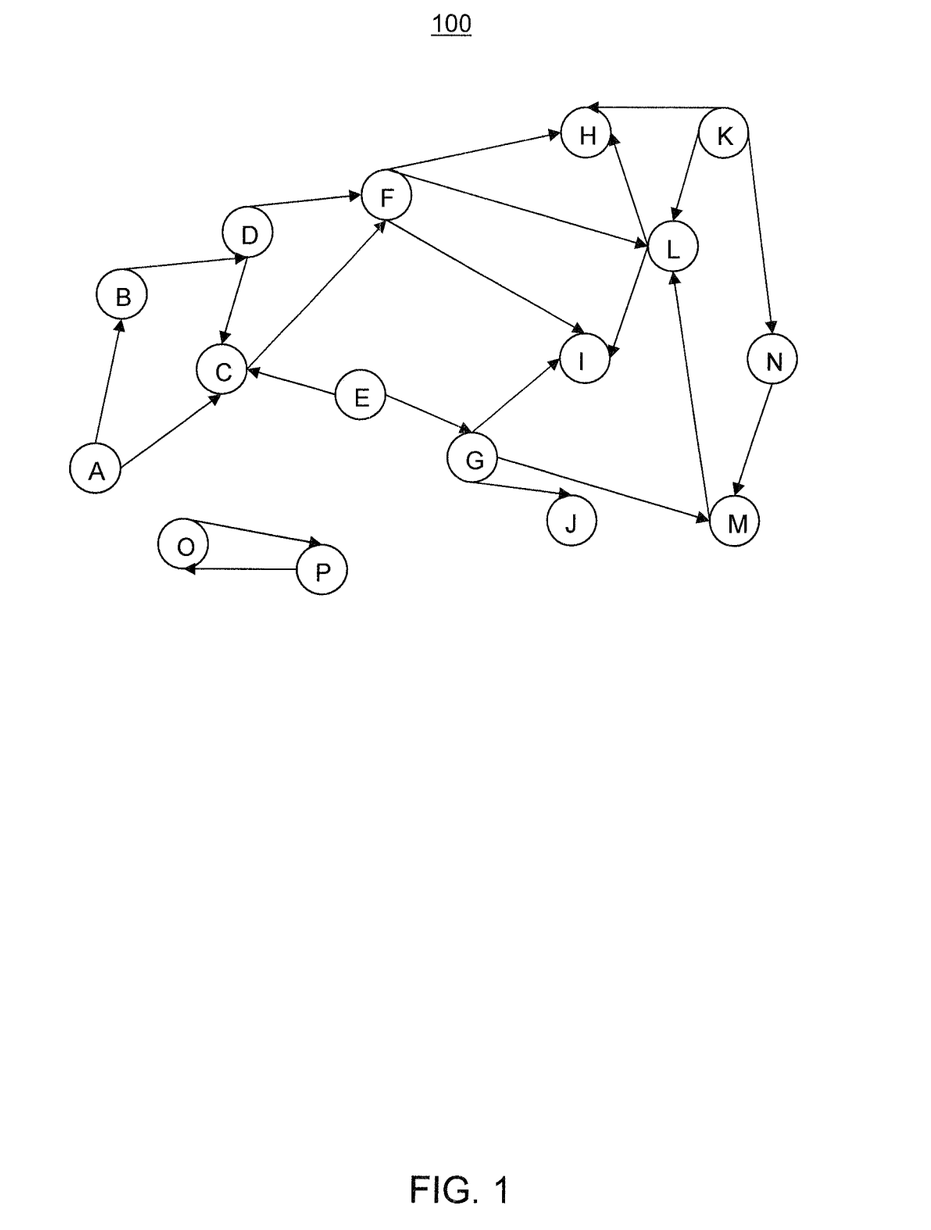
FIG. 1 illustrates part of a massive graph.

FIG. 1 illustrates part of a massive graph. In this example, a web graph 100 is shown. However, the massive graph may be that of a communication network, social network, etc. As shown in FIG. 1, the web graph 100 includes a plurality of nodes A-P and edges (i.e., the arrows between the nodes). Only part of the web graph 100 is shown in FIG. 1, since the web graph 100 may contain more than $10^7$ nodes and $10^{13}$ edges, for example. The nodes A-P of the web graph 100 may represent web pages and the edges of the web graph 100 may represent hyperlinks between the web pages. The linkage structure of the web graph 100 holds a wealth of information that can be exploited for a variety of data mining purposes. For example, web browsing patterns identified through mining can be used by governments to classify threats and fight against terrorism or companies to establish better customer relationships by giving their customers exactly what they need.

Figure 2:
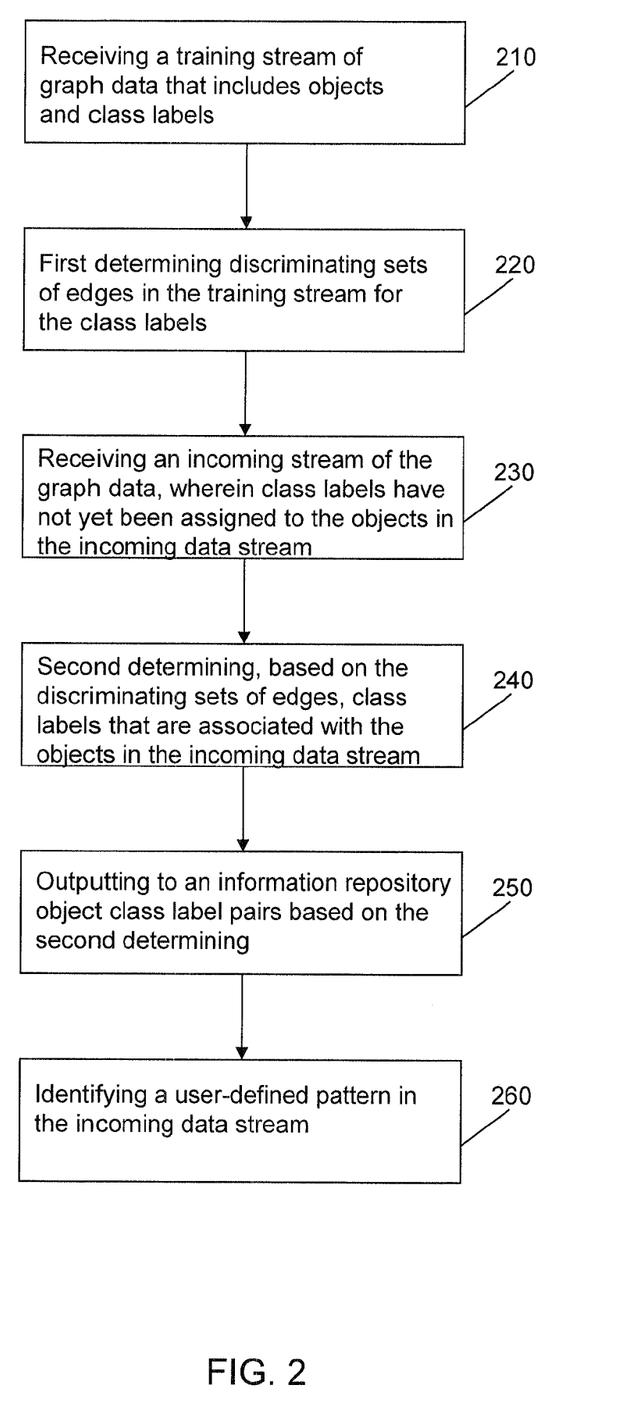
FIG. 2 illustrates a flowchart of a method for classifying objects in a graph data stream according to an exemplary embodiment of the present invention.

FIG. 2 is a flowchart of a method for classifying an object in a graph data stream according to an exemplary embodiment of the present invention. Referring back to FIG. 1, an object may be a group of the nodes A-P together with their edges. For example, an object may include nodes A and B with the single edge therebetween or many more of the nodes and the edges therebetween.

As shown in FIG. 2, a stream processor receives a training stream of data from the web graph 100 (210). The stream processor may be a computing environment that is capable of executing a realtime stream processing platform, such as InfoSphere Streams® (previously known as System S), offered by International Business Machines Corporation, Armonk, N.Y. Details regarding InfoSphere Streams™ are provided in various IBM™ publications including, for example, a publication entitled "IBM InfoSphere Streams, Redefining Real Time Analytics," by Roger Rea and Krishna Mamidipaka, published February, 2010. The InfoSphere Streams™ platform uses a high-level programming language referred to as the Stream Processing Language (SPL; formerly known as SPADE). SPADE is described in "SPADE: System S Declarative Stream Processing Engine," Gedik et al., SIGMOD, Jun. 9-12, 2008, pp. 1123-1134. Further details regarding SPL are described in an IBM® Research Report entitled "SPL Stream Processing Language Specification," Hirzel et al., RC24897 (W0911-044), Nov. 5, 2009. InfoSphere Streams™ and the Stream Processing Language support distributed data stream processing applications that can span a number of computing nodes. The Stream Processing Language declarative language is used, in one example, to program these multi-operator applications. Stream Processing Language's stream-centric design implies a language where the basic building block is a stream. Stream Processing Language's operator-based programming is focused on designing the application around the smallest possible building blocks necessary to deliver the computation an application is designed to perform.

The training stream of graph data received in step 210 contains a plurality of objects along with class labels that are associated with these objects. Individual objects in the stream may be denoted by graphs $G_1 \ldots G_N$. Each graph $G_i$ is associated with a class label $C_i$ that is drawn from $\{1 \ldots m\}$. The web graph 100 may be defined over the node set N. The data in the stream arrives in sequence at the stream processor. For example, the data may arrive as follows ⟨GraphId⟩⟨Edge⟩⟨ClassLabel⟩. It is assumed that in the stream, the class label is always appended to the graph identifier. The edges of a graph $G_i$ may appear out of order in the stream. This is generally the case for many applications such as social networks and communication networks since one cannot control the ordering of messages and communications across different edges. The value of the variable ⟨Edge⟩ is defined by its two constituent nodes.

As an example of some of the data in a stream, consider a network intrusion application in which an identifier corresponds to a time stamp at which an intrusion occurred. The intrusion may induce a set of edges corresponding to a subgraph. Therefore, the graph's identifier may be the time stamp. An edge may contain the source and destination IP address of the attacker and victim. The class label may be the type of intrusion (e.g., "denial of service" attack).

In response to receiving the training stream of graph data, discriminating sets of edges (e.g., subgraphs) in the training stream are determined for the class labels (220). In this step, correlated sets of edges are first found, then they are given class labels to obtain the discriminating sets of edges. For example, subgraphs for which the presence of corresponding co-occurring edges (as a group) is much higher than statistically expected are first found. Such subgraphs are referred to as significant subgraphs in the following discussion. Then, subgraphs which are discriminative toward a particular class are determined.

Before discussing how correlated sets of edges are found and given class labels to obtain the discriminating sets of edges, some relevant notations and definitions will now be introduced.

A significant subgraph P is defined as having significant statistical presence in terms of the relative frequency of its constituent edges. This is referred to as edge coherence. This concept is formally defined as follows. Let $f \cap (P)$ be the fraction of graphs in $G_1 \ldots G_N$ in which all edges of P are present. Let $f \cup (P)$ be the fraction of graphs in which at least one or more of the edges of P are present. Then, the edge coherence C(P) of the subgraph P is denoted by $f \cap (P)/f \cup (P)$.

This definition of edge coherence is focused on the relative presence of subgraph patterns rather than the absolute presence. This ensures that only significant subgraphs are found. This also ensures that large numbers of irrelevant patterns with high frequency but low significance are not considered.

Class confidence of the edge set P with respect to the class label r∈{1 ... m} is defined as follows. Among all graphs containing subgraph P, let s(P,r) be the fraction belonging to class label r. This fraction is the confidence of the pattern P with respect to the class r.

The dominant class confidence for a particular subgraph is then defined as follows. The dominant class confidence DI(P) or subgraph P is defined as the maximum class confidence across all the different classes {1 ... m}. A significantly large value of DI(P) for a particular test instance indicates that the pattern P is very relevant to classification, and the corresponding dominant class label may be an attractive candidate for the test instance label.

To determine subgraphs that are interesting in terms of absolute presence and are discriminative for a particular class, a parameter-pair (α,θ) that corresponds to threshold parameters on the edge coherence and class interest ratio is also used. A subgraph P is said to be (α,θ)-significant if it satisfies the following two edge-coherence and class discriminative constraints. The edge-coherence C(P) of subgraph P is at least α. C(P)≥α. The dominant class confidence DI(P) is at least θ. DI(P)≥θ.

To find correlated sets of edges, a 2D hash compression technique, according to an exemplary embodiment of the present invention, is used. This technique employs a continuously updatable data structure that can determine the most relevant discriminative subgraphs for classification. Since the data structure is small, it can be maintained in main memory and used at any point during the arrival of an incoming data stream.

For ease in discussion, the data structure may be a tabular binary representation of the graph data set with N rows and n columns. The N rows correspond to the N different graphs present in the data. The columns represent the different edges in the data; however, this is not a one-to-one mapping. The choice of n depends upon the space available to hold the table in main memory. Two 2D hash compression techniques may be used in accordance with the preset invention. One that uses a min-hash compression on the rows only, where each column corresponds to a distinct edge. And one that maps multiple columns into a single column with the use of a conventional hash function, then uses a min-hash compression on the rows.

The first technique will now be discussed.

A main idea of this min-hash scheme is to determine co-occurrence in the values on different columns by using a sort-order on the rows in the data. To create this sort-order, a single uniformly random hash value is generated for each row in the data. All the columns in the data are sorted by order of this hash value. Note that such an approach results in each column being sorted in exactly the same random order. The following may thus be observed.

Consider a set of P edges. Let P' be the columns in the table corresponding to P. The columns are examined in sorted order by hash value. The probability that the indices of the first row for each column in P' with a 1-value are the same is equal to the edge coherence C(P).

The above observation is easy to verify, since the index of the first row with a 1 in any of the columns in P' is also the first row in which any of the edges of P' are present. The probability that this row contains all 1-values across the relevant columns is the edge coherence probability C(P).

This approach can be used to construct a sampling estimate of the edge coherence probability. For example, k different hash values can be used to construct the sort order, and the above-mentioned probability can be estimated by computing the fraction of the k samples for which all values are 1.

Now, an implementation of the first technique with the use of a complete table will be discussed. In this case, assume that the table has E columns, where E=N·(N−1)/2 is the number of possible distinct edges in the data. The min-hash index is used to construct a transactional representation of the underlying data. To do this, first apply the min-hash approach with k different hash values to create a table of size k×E. Now, examine a particular sample from this min-hash representation. Let $r_1 \ldots r_E$ be the row indices of the first row with a 1 in the corresponding column. Then, partition the set $r_1 \ldots r_E$ into groups for which the min-hash index values are the same. Thus, if $r_1 \ldots r_E$ are partitioned into $Q_1 \ldots Q_h$, each $r_i \in Q_j$ has the same value (for fixed j). For each partition $Q_j$, create a categorical transaction containing the indices of the corresponding columns. For example, if $Q_j=\{r_2, r_{23}, r_{45}, r_{71}\}$, then create the transaction $T_j=\{2, 23, 45, 71\}$. Finally, construct transactions $T_1 \ldots T_h$ corresponding to the equi-index partitions $Q_1 \ldots Q_h$. Since each index set creates a corresponding transaction set, the accuracy of the estimation process can be improved by repeating this sampling process k times and creating k different index sets. For example, for each index set, add corresponding transaction sets to the overall transaction set T. The following observation is made.

Let T be the transactions constructed from the min-hash index set. Then, the coherence probability C(P) of an edge set P can be estimated as the absolute support of P' in the transaction set T, divided by k. Edges that have a high coherence probability C(P) are determined to be correlated sets of edges.

This observation is a direct extension of the prior observation. This is because the column set P' supports a transaction in $T_1 \ldots T_h$ if and only if the min-hash indices of the edges in P' are the same in the corresponding min-hash sample from which the transaction was constructed.

Note that the rows of the table representing edge presence in a particular graph may not be available at a given time. This is because the edges for a given graph may not arrive contiguously in the stream scenario. Furthermore, the data is typically very sparse and most values in the table are 0. Therefore, the present invention employs novel update process that can work with sparse unordered edges. An example of this process is shown by algorithm 300 in FIG. 3.

Figure 3:
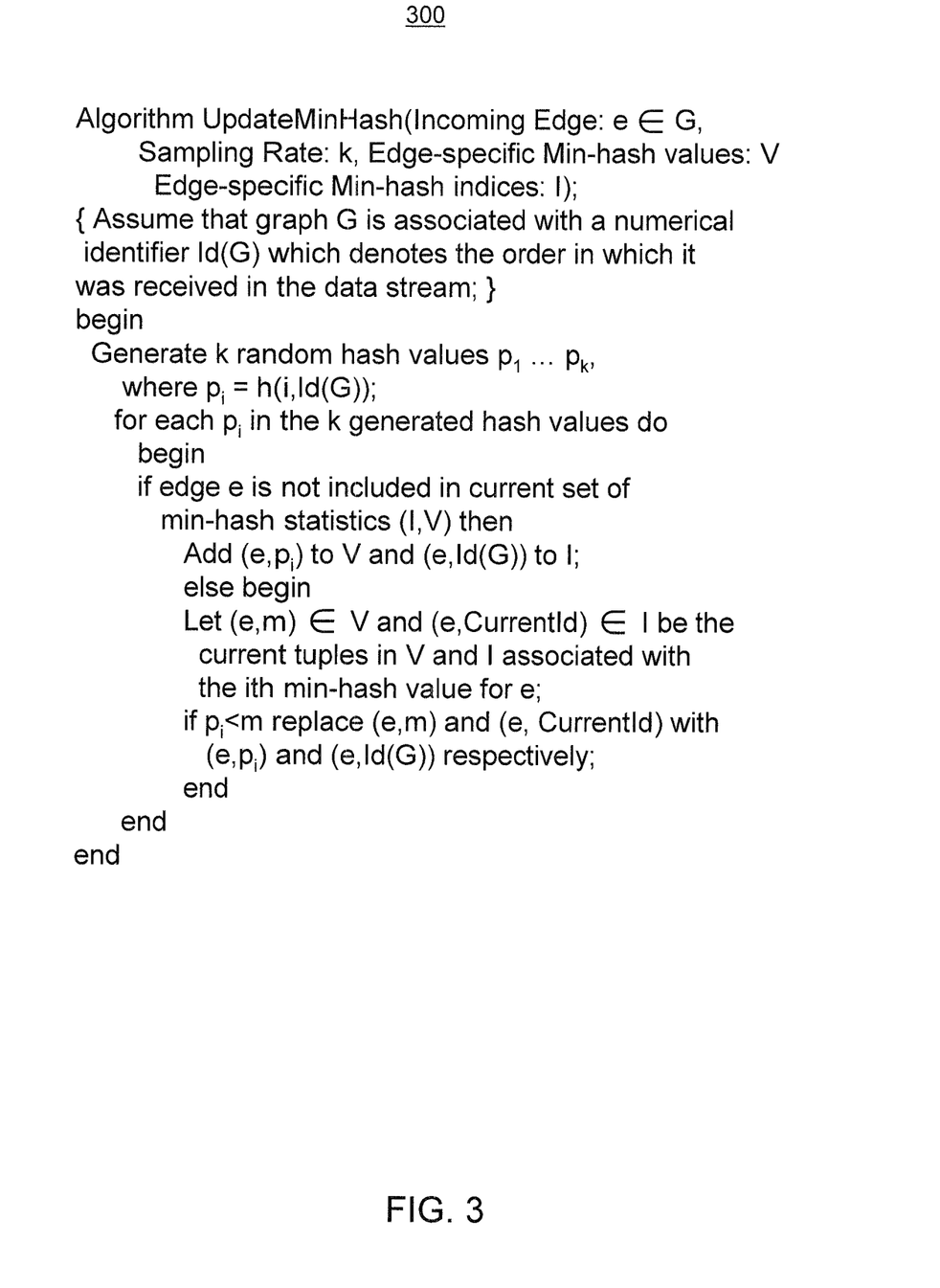
FIG. 3 illustrates an algorithm for updating a min-hash index for each incoming edge of a graph data stream according to an exemplary embodiment of the present invention.

As shown in FIG. 3, for each incoming graph edge e∈G in the stream (with graph identifier Id(G)), k random hash values h(1,Id(G)) ... h(k,Id(G)) are generated. The i th hash value h(i,Id(G)) is denoted by $p_i$. The hash function h(•,•) uses Id(G) as an input, so the same random hash value can be generated when an edge from the same graph G is encountered at a later stage in the stream. To generate the random hash value, a standard hash function may be used on the concatenation of the strings corresponding to the two arguments of h(•,•).

Let L be the running estimate of the number of distinct edges encountered so far in the stream. Algorithm 300 maintains a set V of k·L running minimum hash values together with a set I of k·L corresponding graph identifiers for which these minimum values were obtained. The value of L will increase during progression of the data stream, as more and more distinct edges are received by the stream. Each entry in V is of the form (e,MinHashValue), and each entry in I is of the form (e,GraphIdentifier). There are k such entries in both V and I for each distinct edge encountered so far in the data stream. For each edge e, the i th minimum hash samples in V represents the minimum value of h(i,Id(G)) over all graphs G that contain e. The k entries in I for a particular edge e represent the k graph identifiers for which these minimum hash values in V were obtained.

Since the edges in the streams may appear out of order, by application of the algorithm 300 each edge is associated with its corresponding graph identifier in the stream. In this case, for each incoming edge e and graph identifier Id(G), the sets V and I are updated by algorithm 300 as follows. Generate the k different hash values $p_1$=h(1,Id(G)) ... $p_k$=h(k,Id(G)). In the event that the edge e has not been encountered so far, its information will not be present in V and I. In such a case, the value of L is incremented, and the corresponding entries for e are included in V and I respectively. Specifically, the k hash values in V for this newly tracked edge are set to the k recently generated hash values $p_1 \ldots p_k$. Therefore, the entries $(e,p_1) \ldots (e,p_k)$ are included in V. Correspondingly, the entries (e,Id(G)) ... (e,Id(G)) are added to V. On the other hand, if the edge e has already been encountered in the stream, the corresponding entries (e,MinHashValue$_1$) ... (e,MinHashValue$_k$) are examined in V. In the event that the newly generated hash value $p_i$ is less than MinHashValue$_i$, then (e,MinHashValue$_i$) is replaced by (e,$p_i$). In addition, the corresponding entry in I is replaced by (e,Id(G)).

Figure 4:
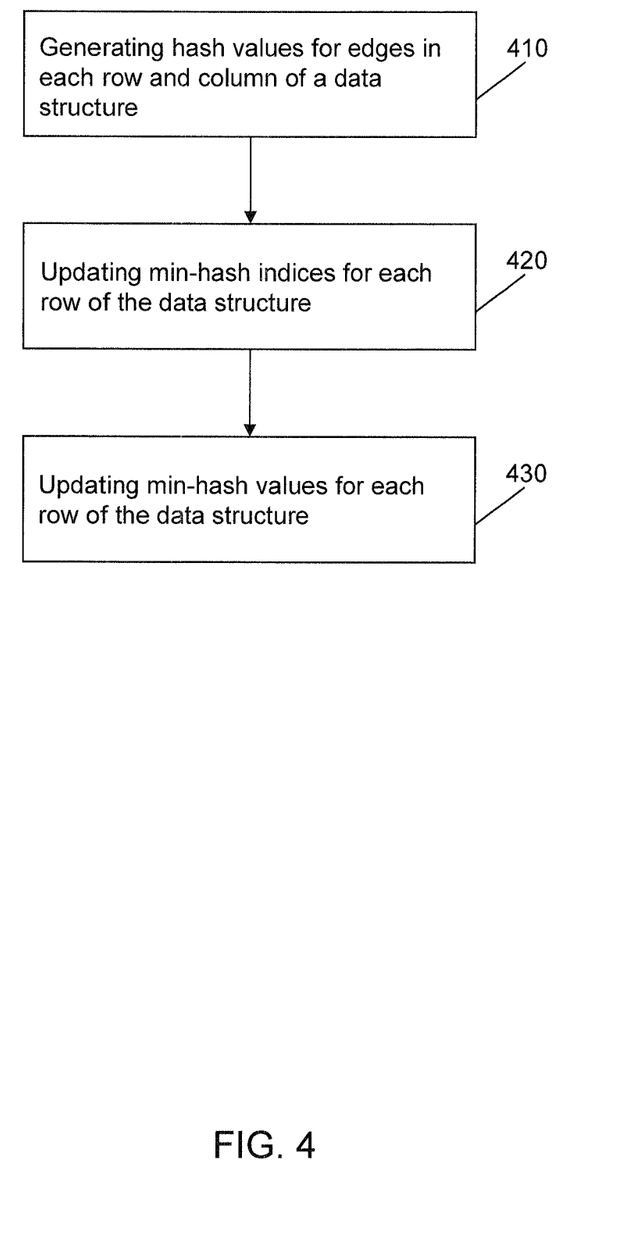
FIG. 4 illustrates a flowchart corresponding to part of the algorithm shown in FIG.

FIG. 4 is a flowchart illustrating a process of updating the min-hash index for each incoming edge, reflecting part of the algorithm 300 in FIG. 3. In particular, FIG. 4 shows the steps required for each incoming graph stream. In step 410, k random hash values for each row, wherein the row is essentially an incoming graph in the stream, are generated. The k random hash values are also referred to as $p_1 \ldots p_k$ in FIG. 3. In step 420, the min-hash indices for each row are updated. In step, 430, the min-hash values for each row are updated. These updates are performed only if the generated min-hash value is lower than its current value. This generation step is performed by the innermost loop of FIG. 3.

As can be seen, the process discussed with reference to FIGS. 3 and 4 continuously maintains a summary representation of the incoming graphs. Since these summary statistics are maintained in main memory, they can be utilized at any time to determine the coherent edge patterns, i.e., correlated sets of edges.

Note that the main constant with the use of the algorithm 300 of FIG. 3 is that the summary statistics V and I have size O(k·L), where L is the number of distinct edges encountered so far. The problem here is that the value of L may be very large because of the massive graph assumptions discussed in this disclosure. Such large summarizations may not be easily maintained on disk or in main memory, which is required for an efficient update process in this scenario. Therefore, the min-hash row compression algorithm 300 of FIG. 3 is supplemented with the process illustrated by algorithm 500 in FIG. 5. The process shown in FIG. 5, which is the second min-hash technique, uses column compression to reduce the size of the data structure. This results in a simultaneous row and column compression, although the column compression in FIG. 5 is performed differently than that in FIG. 3.

Figure 5:
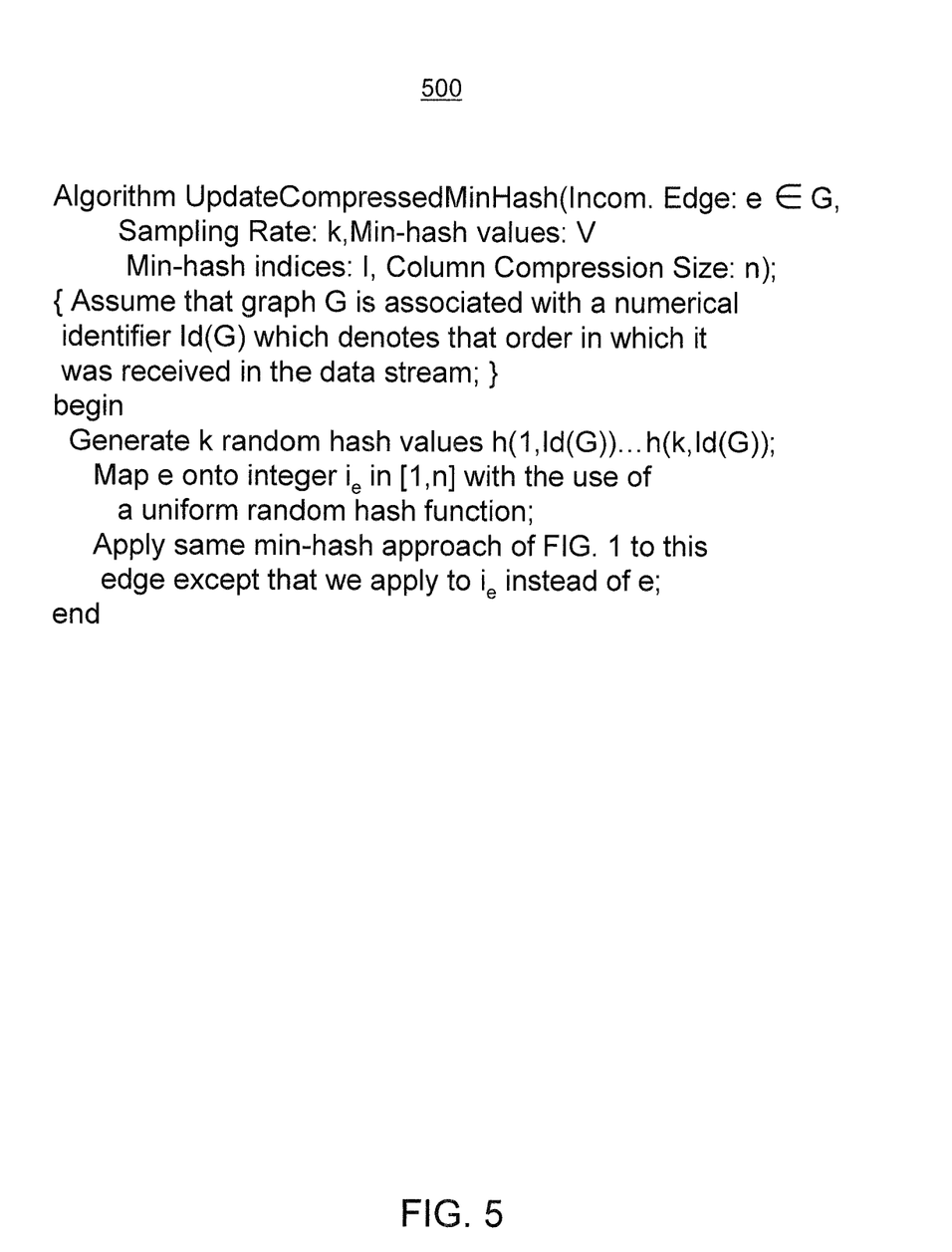
FIG. 5 illustrates an algorithm for updating a min-hash index for each incoming graph of a graph data stream with column compression according to an exemplary embodiment of the present invention.

The algorithm 500 of FIG. 5 is similar to the algorithm 300 of FIG. 3, except that each edge in the data is first mapped to an integer in the range [1,n] with the use of a uniform random hash function, and then the steps of the algorithm 300 of FIG. 3 are applied. Thus, in this case, instead of determining patterns on the actual edges, patterns on the integers in the range [1,n] are determined. In addition, the algorithm 500 of FIG. 5 differs from the algorithm 300 of FIG. 3 in the sense that it uses the column compression size n as an input, and uses it to map each edge onto an integer in [1,n]. In the algorithm 300, this mapping is done with the use of a uniform hash function. A string representation of the edge is constructed by concatenating the node labels of the two ends. The hash function is then applied to this string representation.

The value of n may be picked based on storage considerations, and is typically much lower than the number of distinct edges. The choice of n results from a tradeoff between storage size and accuracy. Since multiple edges may map onto the same integer, this approach may result in some further degradation of the accuracy of computation. However, the column compression scheme significantly reduces the space requirements at a relatively small degradation in quality.

Figure 6:
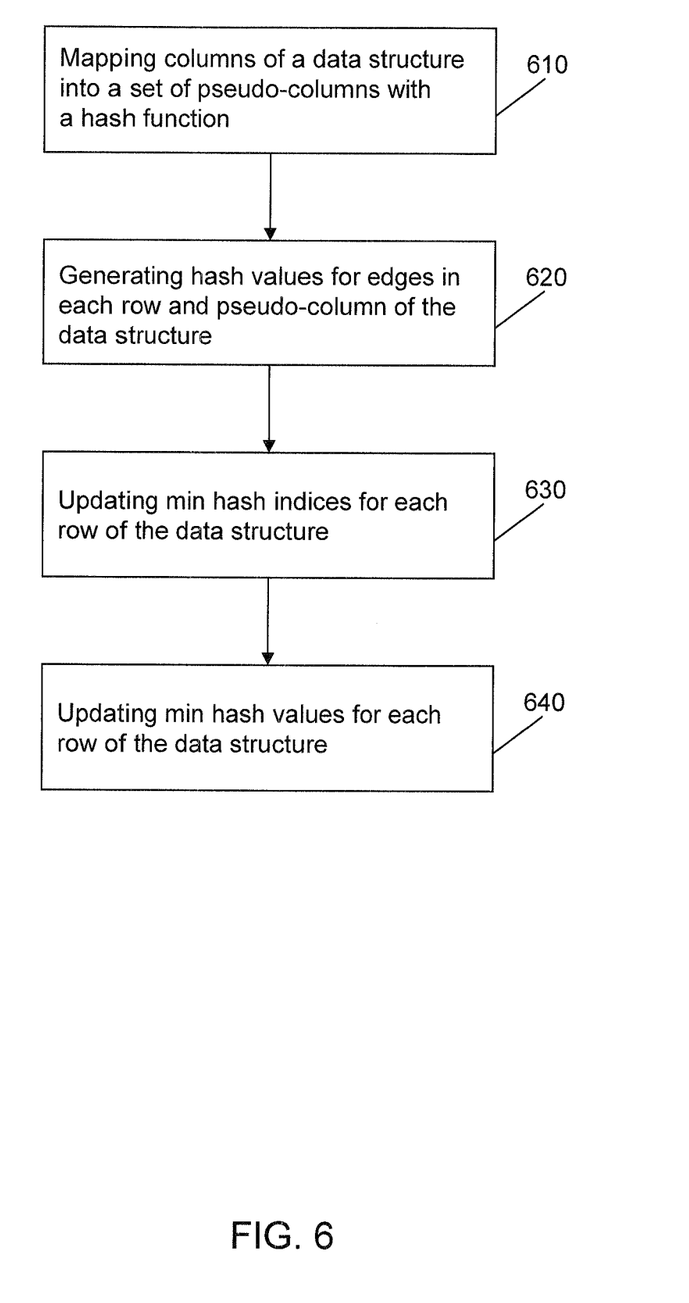
FIG. 6 illustrates a flowchart corresponding to part of the algorithm shown in FIG. 5.

A flowchart showing a method of updating the hash indices for each incoming graph with column compression, reflecting part of the algorithm 500 in FIG. 5, is illustrated in FIG. 6. This flowchart is similar to that shown in FIG. 4, except that the edges are being mapped to a more restricted set of hash values. This is done because the number of distinct edges may be too large to track the hash values for all the distinct edges. As shown in FIG. 6, in step 610 the edges are mapped onto a restricted set of pseudo-columns with a conventional hash function. The subsequent steps are similar to those in FIG. 4. In step 620, hash values for different rows are generated. In steps 630 and 640, current min-hash indices and values are respectively generated, if the generated min-hash values are lower than their current values encountered so far in the stream.

Class labels are also tracked while executing the min-hashing schemes. As mentioned earlier, it is assumed that the class labels of the graphs are appended to the identifier Id(G) for each graph G. Thus, the class labels are tracked along with the graph identifiers. Specifically, the last portion of the graph identifier is the class label of that graph. Since the min-hash indices contain the graph identifiers, they implicitly also contain the class labels.

These class labels are used to compute the discriminative sets of edges from the compressed summary of the data. This is achieved by determining the frequent patterns of edges in the min-hash index (in other words, the coherent or correlated edge patterns) that are highly correlated with a particular class label. Specifically, the dominant class label that is related to the frequent patterns determined in the min-hash phase is determined, and all the sets of patterns in which the class presence is above a user-defined threshold are preserved.

Referring now to step 230 in FIG. 2, the stream processor receives an incoming stream of the graph data. Note that this stream is similar to the training stream, except that class labels have not yet been assigned to the objects in the stream. An example of such a stream could be an intrusion application in which the nature of the intrusions have not yet been determined, but the subgraphs corresponding to the intrusions have been received. Using the incoming stream of graph data as input, class labels are associated with the objects in the incoming data stream (240). This is done by using the discriminating sets of edges determined in step 220. Specifically, objects corresponding to the discriminative subgraphs determined in the training phase are found in the incoming graph. A found object is then assigned the class label of its sole corresponding subgraph or the majority class label of its corresponding subgraphs.

These object class label pairs may then be output from the stream processor and stored in an information repository (250). These pairs can be processed to provide useful information for a wide variety of applications. In particular, a user may define a particular pattern to be found in the incoming data stream (260). For example, in an intrusion detection application, a user may want to know about the nature of an intrusion attack (e.g., whether it is a "denial of service" attack). The object class label pairs could provide information about the nature of such an attack by labeling classes in the incoming stream as "denial of service."

An exemplary embodiment of the present invention will now be described with reference to apparatus 701 in FIG. 7. The apparatus 701, which may be a computer, includes a memory 702, a disk 703, and a processor such as a central processing unit (CPU) 704.

It is to be understood that the term "processor" as used herein is intended to include any processing device, such as, for example, one that includes a CPU and/or other forms of processing circuitry, such as the stream processor discussed above with reference to FIG. 2. Further, the term "processor" may refer to more than one individual processor. The term "memory" is intended include memory associated with a processor or CPU, such as, for example, RAM, ROM, a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer).

Figure 7:
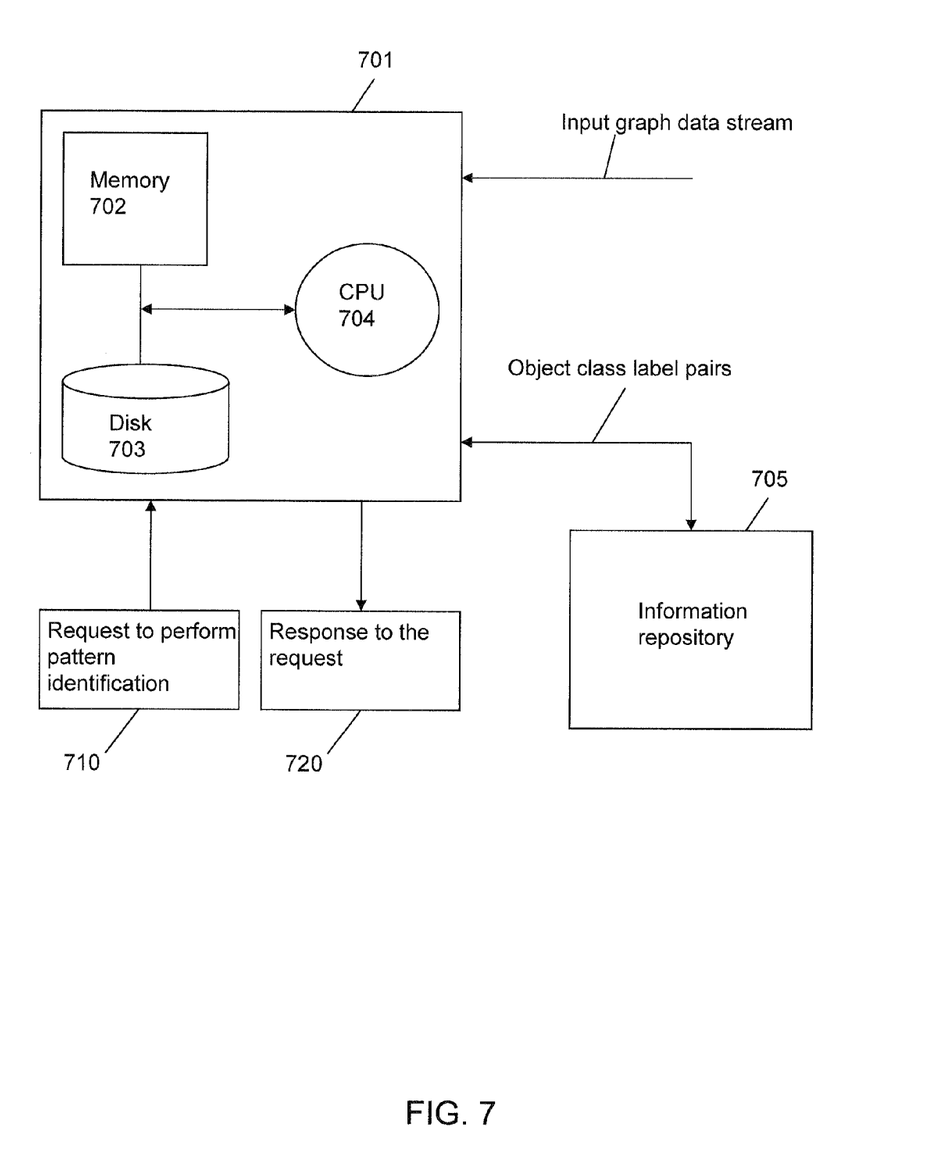
FIG. 7 illustrates an apparatus for implementing exemplary embodiments of the present invention.

As shown in FIG. 7, when the apparatus 701 receives a graph data stream such as a training stream via an input interface, it may be stored in the 2D data structure described above with reference to FIGS. 2-6 in the memory 702. The graph data stream may come from any type of massive graph. The input graph data is processed by the CPU 704 to determine discriminating sets of edges in a manner described above with reference to FIGS. 2-6, for example. The discriminating sets of edges along with their class labels may be stored in disk 703. When the apparatus 701 receives a non-training/test graph data stream via the input interface, the input data stream may be placed in memory 702. The discriminating sets of edges stored in disk 703 may then be accessed and class labels associated with objects in the non-training/test graph data stream are determined in a manner described with reference to FIGS. 2-6. Object class label pairs based on this determining may then be output through an output interface of the apparatus 701 to an information repository 705. The information repository 705 may be in the form of a disk storage device on which the object class label pairs are stored. The object class label pairs can be stored in any kind of database for future processing.

To identify a desired pattern in the non-training graph data stream, the object class label pairs may be accessed from the information repository 705 by the apparatus 701 or another computing apparatus. The object class label pairs may then be analyzed to determine the desired pattern. For example, object class label pairs that are indicative of the behavior of a user when they visit a particular web site can be found. In some embodiments, a request to perform pattern identification 710 may be input to apparatus 701, such as a search request that is input from a user. In some embodiments, a response 720 to the request is output from apparatus 701.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for classifying objects in a graph data stream, the graph data stream including a plurality of nodes that represent elements and edges that represent connections between the elements, and wherein an object in the data stream is a group of nodes together with the edges between those nodes, the method comprising:
    receiving a training stream of graph data, the training stream including a plurality of objects along with class labels that are associated with each of the nodes and edges of the objects;
    first determining discriminating sets of edges in the training stream for the class labels, wherein a discriminating set of edges is one that is indicative of the object that contains these edges having a given class label;
    receiving an incoming data stream of the graph data, wherein class labels have not yet been assigned to objects in the incoming data stream;
    second determining, based on the discriminating sets of edges, class labels that are associated with the objects in the incoming data stream; and
    outputting to an information repository object class label pairs based on the second determining,
    wherein the method is performed using a processor,
    wherein the first determining comprises:
    arranging first incoming edges of the training stream in a two-dimensional (2D) data structure, wherein rows of the 2D data structure correspond to different graphs in the training stream and columns of the 2D data structure represent different edges in the training stream;
    generating hash values for the edges in each row and column of the 2D data structure, the hash values being generated using a min-hash function;
    identifying correlated sets of edges, wherein a correlated set of edges is a set of edges relevant to a particular object in the training data, wherein a set of edges having the same min-hash value is a correlated set of edges; and
    assigning class labels to the correlated sets of edges to obtain the discriminating sets of edges, wherein a class label that is assigned to a particular correlated set of edges is a dominant class label of the correlated set of edges.

2. The method of claim 1, wherein the edges of different objects appear out of order in the graph data.

3. The method of claim 1, wherein the first determining comprises:
    storing the discriminating sets of edges along with their given class labels in a dataset, wherein the dataset is stored on disk or in main computer memory.

4. The method of claim 3, wherein the 2D data structure is stored in the main computer memory.

5. The method of claim 3, further comprising
    receiving second incoming edges of the training stream;
    generating new hash values for the edges in each row and column of the 2D data structure;
    updating the indices and values of the 2D data structure based on the new hash values; and
    repeating the identifying, assigning and storing steps of claim 5 using the updated 2D data structure.

6. A method for classifying objects in a graph data stream, the graph data stream including a plurality of nodes that represent elements and edges that represent connections between the elements, and wherein an object in the data stream is a group of nodes together with the edges between those nodes, the method comprising:
    receiving a training stream of graph data, the training stream including a plurality of objects along with class labels that are associated with each of the nodes and edges of the objects;
    first determining discriminating sets of edges in the training stream for the class labels, wherein a discriminating set of edges is one that is indicative of the object that contains these edges having a given class label;
    receiving an incoming data stream of the graph data, wherein class labels have not yet been assigned to objects in the incoming data stream;
    second determining, based on the discriminating sets of edges, class labels that are associated with the objects in the incoming data stream; and
    outputting to an information repository object class label pairs based on the second determining,
    wherein the method is performed using a processor,
    wherein the first determining comprises:
    arranging first incoming edges of the training stream in a 2D data structure, wherein rows of the 2D data structure correspond to different graphs in the training stream and columns of the 2D data structure represent different edges in the training stream;

mapping columns of the 2D data structure into pseudo-columns with a first hash function, each pseudo-column including a plurality of columns mapped thereinto;

generating hash values for the edges in each row and pseudo-column of the 2D data structure, the hash values being generated using a min-hash function;

identifying correlated sets of edges, wherein a correlated set of edges is a set of edges relevant to a particular object in the training data, wherein a set of edges having the same min-hash value is a correlated set of edges;

assigning class labels to the correlated sets of edges to obtain the discriminating sets of edges, wherein a class label that is assigned to a particular correlated set of edges is a dominant class label of the correlated set of edges; and storing the discriminating sets of edges along with their given class labels in a dataset, wherein the dataset is stored on disk or in main computer memory.

7. The method of claim 6, wherein the 2D data structure is stored in the main computer memory.

8. The method of claim 6, further comprising:

receiving second incoming edges of the training stream;

mapping columns of the 2D data structure in which the second incoming edges are placed into pseudo-columns with the first hash function;

generating new hash values for the edges in each row and pseudo-column of the 2D data structure;

updating the indices and values of the 2D data structure based on the new hash values; and repeating the identifying, assigning and storing steps of claim 7 using the updated 2D data structure.

9. The method of claim 1, wherein the second determining comprises:

for a particular object in the incoming data stream, (a) accessing a memory in which the discriminating sets of edges in the training stream for the class labels are stored and (b) finding discriminating sets of edges that correspond to the object; and assigning a dominant class label of these discriminating sets of edges as the object's class label.

10. The method of claim 1, further comprising:

receiving a request to find a user-defined pattern in the incoming data stream;

searching for object class label pairs stored in the information repository that correspond to parameters of the user-defined pattern; and displaying results of the search to the user.

11. The method of claim 10, wherein the user-defined pattern includes a communication pattern of users in a social network within a certain time window, a browsing pattern of a user of a web graph upon entering a particular web page, or intrusion traffic on a communication network.

12. The method of claim 1, wherein the graph data is provided from a web graph, social network or communication network.

13. The method of claim 12, wherein nodes of the web graph include uniform resource locator (URL) addresses and edges of the web graph include links between the URL addresses, nodes of the social network include user identifiers and edges of the social network include links between the user identifiers, or nodes of the communication network include internet protocol (IP) addresses and edges of the communication network include links between the IP addresses.

14. A computer program product for classifying objects in a graph data stream, the graph data stream including a plurality of nodes that represent elements and edges that represent connections between the elements, and wherein an object in the data stream is a group of nodes together with the edges between those nodes, comprising:

a non-transitory computer readable storage medium having computer readable program code embodied therewith, the computer readable program code comprising:

computer readable program code configured to perform the steps of:

receiving a training stream of graph data, the training stream including a plurality of objects along with class labels that are associated with each of the nodes and edges of the objects;

first determining discriminating sets of edges in the training stream for the class labels, wherein a discriminating set of edges is one that is indicative of the object that contains these edges having a given class label;

receiving an incoming data stream of the graph data, wherein class labels have not yet been assigned to objects in the incoming data stream;

second determining, based on the discriminating sets of edges, class labels that are associated with the objects in the incoming data stream; and outputting to an information repository object class label pairs based on the second determining, wherein the first determining comprises:

arranging first incoming edges of the training stream in a two-dimensional (2D) data structure, wherein rows of the 2D data structure correspond to different graphs in the training stream and columns of the 2D data structure represent different edges in the training stream;

generating hash values for the edges in each row and column of the 2D data structure, the hash values being generated using a min-hash function;

identifying correlated sets of edges, wherein a correlated set of edges is a set of edges relevant to a particular object in the training data, wherein a set of edges having the same min-hash value is a correlated set of edges; and assigning class labels to the correlated sets of edges to obtain the discriminating sets of edges, wherein a class label that is assigned to a particular correlated set of edges is a dominant class label of the correlated set of edges.

15. The computer program product of claim 14, wherein the first determining comprises:

storing the discriminating sets of edges along with their given class labels in a dataset.

16. The method of claim 1, wherein a single uniformly random hash value is generated for each row and all of the columns are sorted by order of this hash value.

* * * * *